(12) United States Patent
Louise et al.

(10) Patent No.: US 8,515,598 B2
(45) Date of Patent: Aug. 20, 2013

(54) METHOD AND DEVICE FOR AIDING THE FLIGHT MANAGEMENT OF AN AIRCRAFT

(75) Inventors: Pascale Louise, Toulouse (FR); Thierry Bourret, Toulouse (FR); Marie-Odile Plantecoste, Pibrac (FR); Charles Renault Lerberquer, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/369,590

(22) Filed: Feb. 9, 2012

(65) Prior Publication Data

US 2012/0215386 A1  Aug. 23, 2012

(30) Foreign Application Priority Data

Feb. 17, 2011  (FR) ...................... 11 51305

(51) Int. Cl.
*G05D 1/00*     (2006.01)
(52) U.S. Cl.
USPC ............... 701/3; 701/411; 701/416; 701/417; 701/431; 701/467; 701/538
(58) Field of Classification Search
USPC .............. 701/3, 411, 416, 417, 431, 467, 538
See application file for complete search history.

(56) References Cited

U.S. PATENT DOCUMENTS

| 8,090,531 B2 | 1/2012 | Goutelard et al. | |
| 2010/0305784 A1* | 12/2010 | Anderson et al. | 701/9 |
| 2010/0324812 A1* | 12/2010 | Sacle et al. | 701/206 |

FOREIGN PATENT DOCUMENTS

| FR | 2921152 | 3/2009 |
| FR | 2945622 | 11/2010 |
| WO | 2005012837 | 2/2005 |

OTHER PUBLICATIONS

French Patent Office, French Search Report FR 1151305, Oct. 27, 2011 (2 pgs).

* cited by examiner

*Primary Examiner* — Mary Cheung
*Assistant Examiner* — Brian P Sweeney
(74) *Attorney, Agent, or Firm* — Wood, Herron & Evans, LLP

(57) ABSTRACT

A device for aiding the flight management of an aircraft includes a calculation device for determining in real time an updated lateral trajectory that the aircraft will follow and a display device for displaying this updated lateral trajectory on a cockpit screen of the aircraft. Consequently, the crew of the aircraft is able to readily visualize and understand the updated lateral trajectory that will put the aircraft back on the original course as a result of the display on the display device.

13 Claims, 3 Drawing Sheets

METHOD AND DEVICE FOR AIDING THE FLIGHT MANAGEMENT OF AN AIRCRAFT

TECHNICAL FIELD

The present invention relates to a method and a device for aiding the flight management of an aircraft, in particular a transport airplane, being able to be guided according to any of a plurality of different guiding modes.

The present invention more particularly relates to displaying a lateral trajectory that the aircraft is about to fly, whatever the guiding mode being used, whether it is for an automatic guidance carried out by an automatic piloting system of the aircraft or for a manual guidance carried out by the pilot respecting guiding orders from a flight director. The trajectory being easy to be defines when the aircraft follows a flight plane, the present invention is more particularly applied to calculating and displaying the lateral trajectory when the aircraft is out of the flight plane (for example, when following a heading or a track directive, or also when the aircraft is in a runway axis capturing and holding mode). Such <<out of flight plane>> modes are mainly used in dynamic phases for responding to requests from the air control or for avoiding difficult weather conditions. In such situations, an exact representation of the trajectory is necessary so that the crew could have a right overview of the evolution of the aircraft so as to take, if appropriate, the necessary decisions (for example, better specifying the track and heading commands).

BACKGROUND

On the existing aircrafts, upon a track or heading to be modified, being captured in a flight control unit of the FCU ("Flight Control Unit") type, a usual displaying system generally visualizes on a navigation screen of the ND ("Navigation Screen") type:
- the heading (or the track) directive; as well as
- the present heading and the continuation of the current track.

Thus, when the heading or the track directive is modified, the aircraft is turning, but the ND navigation screen displays a straight line segment indicating the current track. This straight line segment does not show the trajectory according to which the aircraft will fly (as the latter will follow a curved trajectory until the new directive, then a rectilinear trajectory), but it only illustrates an indication of the instantaneous track at a given instant. Consequently, the usual displaying devices do not allow a visualization of the lateral trajectory the aircraft will actually follow in such a situation.

Moreover, upon an approach, this straight line segment remains displayed when the crew arm an approaching mode for aligning the aircraft on the axis of a landing runway (for example thru pushing on a button of the <<APPR>> or <<LOC>> type on the flight control unit FCU). In such a case, the navigation screen displays a rectilinear trajectory (extrapolation of the current track), while the aircraft will follow this trajectory only until the capture point for the LOC beam, where the guidance objective will change. The usual displaying devices therefore do not allow a visualization of the trajectory that the aircraft will follow, upon the capture of the axis of a runway upon landing.

In addition, a short term path predictor is known (referred to as <<path predictor>>) that can be displayed. However, this predictor:
- is limited to a prediction for a given flight time, for example 60 seconds; and
- is represented as a circle arc, the curvature radius of which is calculated from the current angle of roll of the aircraft and from the current ground speed.

This predictor therefore only provides an indication on the curvature radius being able to be followed from the current angle of roll of the aircraft. It does not translate, in any case, the reality of the trajectory of an aircraft even at short term. For example, upon approaching the directive of heading, the aircraft will decrease its roll, but the predictor does not anticipate such a change of trajectory.

Upon a modification of the lateral directive (HEADING or RUNWAY mode) on the flight control unit FCU, the crew could therefore actually visualize the direction the aircraft will head to at short term, the point where the aircraft is turning, but have no accurate and immediate information available on the trajectory the aircraft will fly, whatever the modes of the automatic piloting system (prediction of the trajectory as early as the modification of the directive, detection of the end of a roll, real impact of turning and end turning, etc.).

In addition, upon such a modification of the lateral directive when the speed of the aircraft is varying, the pilot has no information available on the impact of the evolution of the speed on the lateral trajectory.

On the other hand, the pilot does not have any information, at the level of the displaying device, relating to the requested rotation direction of a turn. For example, in the case where the aircraft is turning to the left (with a negative current angle of roll—anticlockwise rotation), and the pilot captures a directive higher than 180° of the current heading performing a clockwise rotation of the selector, the predictor indicates an immediate turn in the anticlockwise direction before reversing upon the change of turning direction of the aircraft, according to the directive entered by the pilot.

In addition, when a change of mode is imminent, the pilot does not have available, in all guiding modes, information relating to the moment where this change of mode will occur and to its impact on the flight of the aircraft. For example, if all conditions for the engagement of a mode of capture of a runway axis are about to be gathered, the pilot does not have available information for checking whether the mode of capture of axis will actually engage or not, when the aircraft will start to initiate its turn for getting aligned on the runway, or even, in the case of a high speed or of a late arming of the approaching mode, whether the aircraft will overcome the approach axis.

Now, more and more data are displayed on navigation screens, such as the flight plane with respect to the ground, a meteorological map, the relief, the landing runways, the areas of air control, etc. The crew is therefore bound to take decisions relating to such data as referenced with respect to the ground, but, at the same time, they do not have available information on the predictable trajectory of the aircraft referenced with respect to the ground in all guiding modes available with the automatic piloting system, and this, already upon the change of mode and/or directive captured on the flight control unit. They cannot therefore check that the directives and the selection of mode are in accordance with their intentions, nor even optimize their track.

The present invention relates to a method for aiding the flight management of an aircraft, in particular a transport airplane, being able to be guided according to one of a plurality of different guiding modes, allowing the above mentioned drawbacks to be overcome.

SUMMARY OF THE INVENTION

To this end, according to the invention, the method for aiding the flight management of an aircraft being able to be guided according to one of a plurality of different guiding modes, is remarkable in that, automatically:

a) a set of information is generated, comprising:
- the current values of the flight parameters (air speed, altitude, angle of roll, etc.) of the aircraft;
- a chosen guiding mode, being part of the plurality of different possible guiding modes; and
- at least one lateral directive, that the aircraft should respect, being captured on a flight control unit by an operator;

b) a lateral trajectory that the aircraft will follow is determined in real time, by using at least the set of information and at least one modeling of the guiding law representative of the chosen guiding mode; and c) this lateral trajectory is displayed on a viewing screen of the cockpit of the aircraft, preferably on a navigation screen of the ND type, and optionally, it is also transmitted to systems being embedded on board the aircraft.

Within the scope of the present invention, a <<chosen>> guiding mode refers to, either a selected guiding mode, being engaged, or a simply armed guiding mode, the engagement of which will occur when particular engagement conditions are met.

Thus, thanks to the invention, the lateral trajectory that the aircraft will actually follow is determined and displayed to the crew, in real time, and this, whatever the guiding mode chosen amongst a plurality of different possible guiding modes, including modes other than a trajectory following mode.

When the aircraft follows a flight plane, typically when the automatic piloting system of the aircraft is on a usual NAV mode, the flight plane is correctly indicated on the navigation screen and the trajectory being displayed is the one the aircraft will follow. Thus, the present invention is particularly well appropriate to other modes that are used when the follow up of the flight plane is no longer adapted (for example, when a ground controller requests another trajectory or when the pilot's intentions require a quick action, such as by-passing a cloud of the cumulonimbus type, for which reviewing the flight plane is too long or too complex to be achieved).

The plurality of guiding modes taken into account in the present invention could, specifically, comprise at least some of the following usual modes:
- a mode of holding or reaching a heading;
- a mode of holding or reaching a track;
- a mode of capturing or holding an approach axis on a horizontal plane; and
- a mode of capturing or holding an approach axis on a horizontal and a vertical plane.

Knowing, thanks to the invention, the future lateral trajectory of the aircraft in all guiding modes of an automatic piloting system allows the crew (and other systems) to take the required decisions in numerous operational cases, allowing the above mentioned drawbacks to be overcome.

As set forth hereinunder, the determination of the lateral trajectory is based on the knowledge and the modeling of the flight guiding laws of the aircraft in each one of its guiding modes, on the modeling of the dynamics setting of the aircraft in the atmosphere, as well as on the knowledge of the logics and the conditions of transition from a guiding mode to another.

In addition, in a particular embodiment, said set of information further comprises:
- an indication relating to the wind; and/or
- an indication relating to the speed of the aircraft, to be used at step b) for determining said lateral trajectory, as set forth hereinunder.

Moreover, advantageously, a directive of the heading and the current track of the aircraft are further determined, and at step c), on said viewing screen, two symbols are displayed illustrating respectively said directive of heading and said current track of the aircraft.

On the other hand, advantageously, upon the capture and the follow up of an approach axis at step c), on said viewing screen at least one symbol is displayed illustrating said approach axis.

In addition, upon the capture and the follow up of an approach axis, if a mode of capture of the approach axis to be used for the capture is not armed yet:
- at step b), the last point of the lateral trajectory is determined where it is possible to arm said mode of capture so as not to overcome the approach axis; and
- at step c), on said viewing screen at least one symbol is presented illustrating this last point.

This latter information allows, more specifically, the pilot to anticipate late requests from the air control and/or to modify its directive of speed for avoiding overcoming the approach axis.

In the usual systems of automatic piloting, it is possible, in some cases, to preselect a directive. For example in a follow up mode of the flight plane of the NAV type, it is possible to display a heading value, before engaging the heading follow up mode. This preselected directive is only taken into account when the crew validate it. Thus, in an alternative embodiment, advantageously:
- at step b), an auxiliary lateral trajectory is determined that the aircraft will follow, according to a preselected guiding mode. To this end, the same method of calculation is used as for said lateral trajectory, applying it to the preselected directive; and
- at step c), on said viewing screen, in addition to said lateral trajectory, said auxiliary lateral trajectory is also presented.

Thus, the crew could directly visualize the trajectory linked to the pre-selection of a directive before validating it. In this alternative embodiment, two lateral trajectories are therefore displayed to the crew:
- the predicted trajectory with the currently selected directives; and
- the predicted trajectory with the preselected directives.

In a particular embodiment, the prediction of the lateral trajectory in real time could be coupled to a detecting system for risks of collision of the aircraft with the ground, for detecting a risk of collision with the ground, ahead of the position of the aircraft along said lateral trajectory. Thanks to this particular embodiment, collision alerts could be avoided or detected earlier, as further detailed hereinunder.

Additionally, advantageously, at step b), the determination of the lateral trajectory could be based:
- on a vector calculation; or
- on a step by step calculation, using at any step the values of the flight parameters of the previous step.

The present invention further relates to a device for aiding the flight management of an aircraft, in particular a transport airplane, being able to be guided according to any of a plurality of different guiding modes.

To this end, according to the invention, the device is remarkable in that it comprises:
- a set of sources of information able to generate the current values of flight parameters of the aircraft;
- a flight control unit on which an operator can capture at least one lateral directive, the aircraft should respect;
- a calculation device for determining in real time a lateral trajectory that the aircraft will follow, the lateral trajectory being determined using at least:

one set of information comprising the current values of the flight parameters, a chosen guiding mode, being part of the plurality of different guiding modes, and a captured lateral directive; and at least one modeling of the guiding law representative of the chosen guiding mode; and a displaying device for displaying this lateral trajectory on a viewing screen of the cockpit of the aircraft.

In a preferred embodiment, the calculation device comprises at least models of lateral control, vertical control and speed control, depending on the chosen guiding mode, as well as a model of flight dynamics.

Moreover, in a particular embodiment, the device further comprises an auxiliary calculation device for determining, in real time, an auxiliary lateral trajectory, by using at least one set of information comprising a preselected guiding mode, the auxiliary lateral trajectory being then displayed on the viewing screen.

Additionally, in a particular embodiment, the device according to the invention further comprises a detection system for risks of collision of the aircraft with the ground, able to detect a risk of collision with the ground, ahead of the position of the aircraft along said lateral trajectory.

The present invention also relates to an aircraft, in particular a transport airplane, being provided with a device for aiding the flight management, such as mentioned hereinabove.

BRIEF DESCRIPTION OF THE DRAWINGS

The FIGS. of the appended drawing will better explain how this invention could be implemented. On these FIGS., like reference annotations refer to like components.

FIGS. 3A and 3B to 10A and 10B are couples of FIGS. schematically representing a displaying of navigation data, allowing the essential features of the present invention to be well emphasized. For each couple of FIGS., the FIG. on the left (reference A) illustrates a prior art display and the FIG. on the right (reference B) illustrates a display according to the invention, for the same situation of the aircraft.

Figure 1:
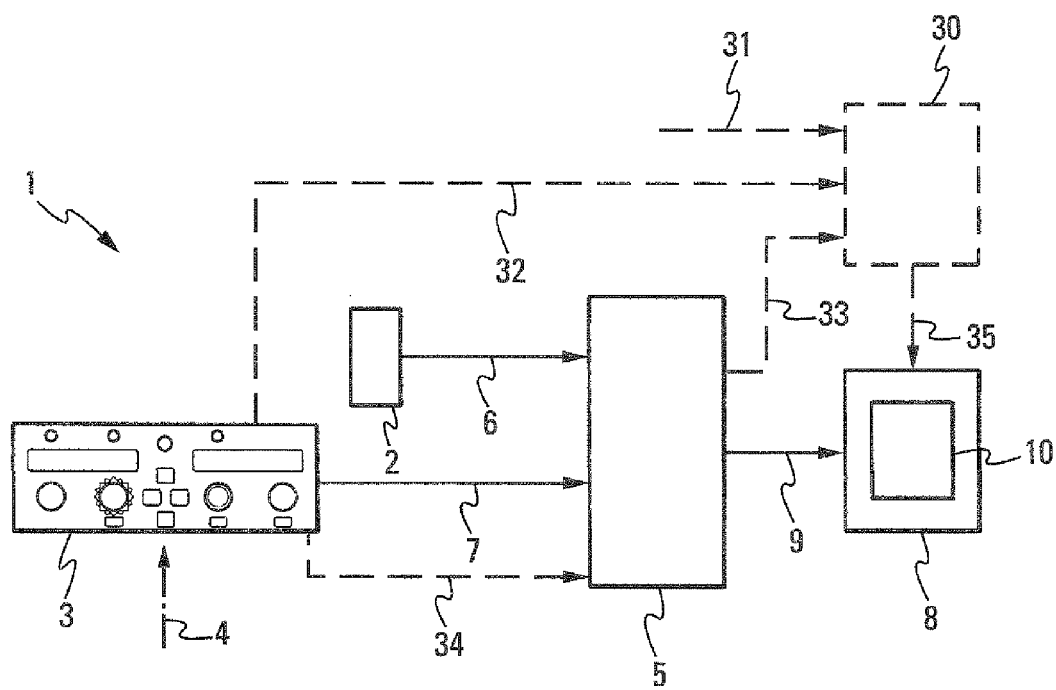
FIG. 1 is a block diagram of a device for aiding the flight management according to the invention.

The device 1 according to the invention, schematically shown on FIG. 1, is adapted for aiding the flight management of an aircraft (not shown), in particular of a transport airplane, being able to be guided according to one of a plurality of different guiding modes, to be further explained hereinunder. This device 1 relates more particularly to displaying a lateral trajectory that the aircraft is about to fly, whatever the guiding mode being used, whether it is for an automatic guidance carried out by a usual automatic piloting system of the aircraft or for a manual guidance carried out by the pilot respecting, more specifically, guiding orders from a usual flight director.

DETAILED DESCRIPTION

According to the invention, the device 1 being embedded comprises, as shown on FIG. 1:

a set 2 of sources of information, being able to generate the current values of flight parameters of the aircraft, to be further detailed hereinunder;

a flight control unit 3, preferably of the FCU ("Flight Control Unit") type, on which an operator could capture at least one lateral directive that the aircraft should respect, as schematically shown by a mixed line arrow 4;

a calculation device 5 being connected via links 6 and 7 respectively to the set 2 and to the flight control unit 3 and being formed so as to determine, in real time, the lateral trajectory that the aircraft will actually follow. As further detailed hereinunder, the calculation device 5 determines the lateral trajectory by using at least:

one set of information comprising the current values of the flight parameters, a chosen guiding mode, being part of the plurality of different guiding modes, and a captured lateral directive; and at least one modeling of the guiding law representative of the chosen guiding mode; and a displaying device 8 being connected via a link 9 to the calculation device 5 and being formed so as to display the lateral trajectory (determined by the latter) on a viewing screen 10 of the cockpit of the aircraft, preferably a usual navigation screen of the ND ("Navigation Display") type.

Within the scope of the present invention, a <<chosen>> guiding mode refers to either a selected guiding mode, being already engaged, that is that the aircraft is guided according to this mode at the current instant, or to a simply armed guiding mode, the engagement of which will occur when particular engagement conditions are met.

Thus, the device 1 according to the invention determines and displays to the crew, in real time, the lateral trajectory that the aircraft will actually follow, and this, whatever the guiding mode chosen amongst a plurality of different possible guiding modes, including modes other than a trajectory following mode.

When the aircraft follows a flight plane, typically when the automatic piloting system of the aircraft is in a usual NAV mode, the flight plane is correctly indicated on the viewing screen 10 and the trajectory being displayed is actually the one the aircraft will follow. Thus, the present invention is particularly well appropriate to other modes that are used when the follow up of the flight plane is no longer adapted for example, when a ground controller requests another trajectory (than that of the flight plane), or when the pilot's intentions require a quick action, such as by-passing a cloud of the cumulonimbus type, for which reviewing the flight plane is too long or too complex to be achieved.

The plurality of guiding modes taken into consideration in the present invention could specifically comprise at least some of the following usual modes:

a mode of holding or reaching a heading;

a mode of holding or reaching a track;

a mode of capturing or holding an approach axis on a horizontal plane; and a mode of capturing or holding an approach axis on a horizontal and a vertical plane.

Knowing the future lateral trajectory of the aircraft in all guiding modes of an automatic piloting system thereby allows the crew (and systems of the aircraft) to take the required actions in numerous operational cases.

The directives able to be captured or modified by a pilot on the flight control unit 3 include, more specifically:

lateral directives:

heading (<<HEADING>> or HDG);

track (<<TRACK>> or TRK); and speed directives:

calibrated air speed (<<Calibrated Air speed>> or CAS)

Mach.

These directives could be directly taken into account by the device, as soon as their value is modified. In some cases, it is however necessary to validate the modification of a directive so that it is actually taken into account (for example, the heading directive in a follow up mode of a flight plane).

The device 1 further usually determines a heading (or a track) directive and the current track of the aircraft, and the displaying device 8 presents on the viewing screen 10 two symbols 11 and 12 respectively illustrating the heading (or track) directive and the current track of the aircraft. As an illustration, the symbol 11 could be represented as a (for example blue) triangle and the symbol 12 could be represented as a (for example green) diamond.

For each couple of FIGS. 3A and 3B to 10A and 10B, the FIG. on the left (reference A) therefore illustrates a prior art display 20A viewing:
- the heading or the track) directive (symbol 11);
- the present track (symbol 12);
- the continuation of the current track, represented for example as a green full line on the display, but being emphasized as a thick broken line 13 on the FIGS. so as to be easily identified; and
- a symbol 14 illustrating the position of the aircraft.

On these left FIGS. (reference A) there is also shown a thin line 16 showing a circle arc providing an indication on the turning implemented by the aircraft. The display shown on FIGS. 3A and 3B to 10A and 10B corresponds to a display according to a mode of the arc type with circle arcs centred on the symbol 14 and usually defining a range scale 15. The present invention could also apply to another displaying mode, for example of the pink type.

Moreover, each right FIG. (reference B) illustrates a display 20B according to the present invention for the same situation (position, speed, heading, guiding mode, etc.) of the aircraft, such a display 20B being implemented on the viewing screen 10. Such couples of FIGS. 3A and 3B to 9A and 9B allow the essential features and advantages of the present invention to be well emphasized.

Figure 3A:
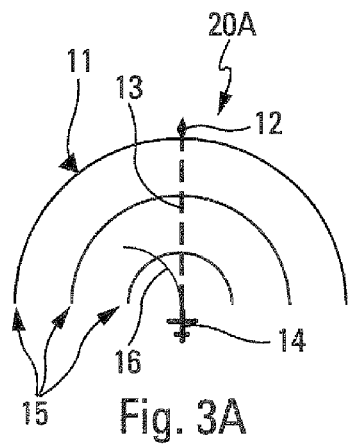
Figure 3B:
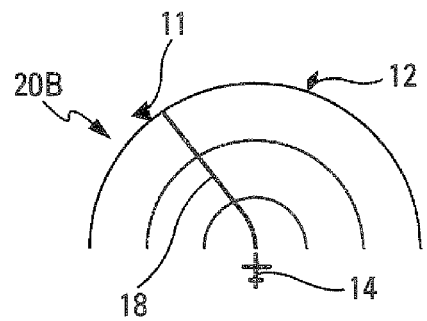

FIGS. 3A and 3B show an example relating to the general concept upon a change of heading directive. Without the prediction of the trajectory (FIG. 3A), it is difficult for the pilot to become aware of the path the aircraft will actually fly. The display 20B according to the present invention allows to visualize the (future)) lateral trajectory, by means of a plot 18 shown as a thick full line. This future trajectory is based on a prediction of the evolution of the angle of roll:
- the angle of roll increases at the beginning of the turn; the angular speed of the aircraft increases;
- the angle of roll stabilizes at a maximum; the angular speed of the aircraft reaches a maximum; and
- the angle of roll decreases at the end of the turn so that the aircraft flies flat; the angular speed of the aircraft decreases until it becomes nil (rectilinear trajectory).

Figure 4A:
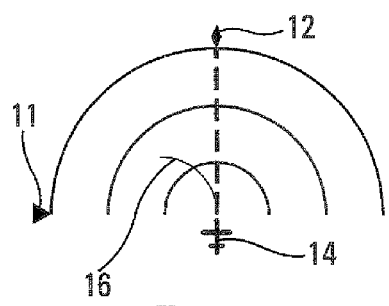
Figure 4B:
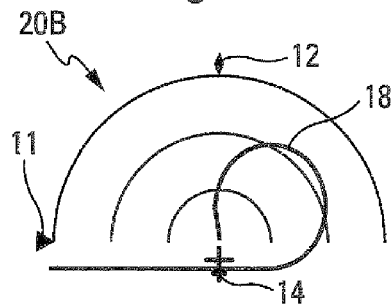

Moreover, on the example of FIGS. 4A and 4B, the aircraft turns to the left, when a directive of ¾ turn to the right is captured on the flight control unit. In the case where the aircraft is turning to the left (with a negative current angle of roll—anticlockwise rotation), and the pilot captures a directive higher than 180° of the current heading performing a clockwise rotation of the selector, the usual display 20A indicates an immediate turn in the anticlockwise direction before reversing upon the change of turn direction of the aircraft, according to the directive entered by the pilot. The solution according to the present invention (display 20B) allows the rotation direction used by the aircraft to be clarified for reaching its heading directive.

In some guiding modes, the reference followed during the flight is an "air" reference, for example for a mode of holding or reaching a heading. In this case, the trajectory on the ground depends on the wind. In order to improve the predicted trajectory (reference with respect to the ground), in a particular embodiment, the calculation device 5 takes into account the wind for determining the lateral trajectory that the aircraft will follow. This could be achieved:
- either using a measured value of the wind being considered as not varying along the trajectory;
- or using a prediction of the wind, when the meteorological data required for implementing such a prediction is available. In this latter case, the current wind and 3D meteorological data are hybridized, usually, for modeling to the best the wind encountered along the trajectory.

Additionally, it is known that, upon changes of directive, the modes of the automatic piloting system generally limit the angle of roll. Now at a constant angle of roll, the radius of the trajectory on the ground mainly depends on the speed of the aircraft, in addition to the effects associated with the wind. Knowing the speed of the aircraft therefore has a major influence on the prediction of the trajectory upon turns. Thus, in a particular embodiment, with the aim to improve the predicted trajectory, the calculation device 5 also takes into account the speed for determining the lateral trajectory that the aircraft will follow. This could be achieved:
- either using the current speed of the aircraft;
- or taking into account the possible changes of speed directive such as selected by the crew, when this directive is selected. When the profile of speed reduction is automatically determined by a system of flight management, it becomes easy to predict the evolutions of the speed from this profile.

Figure 5A:
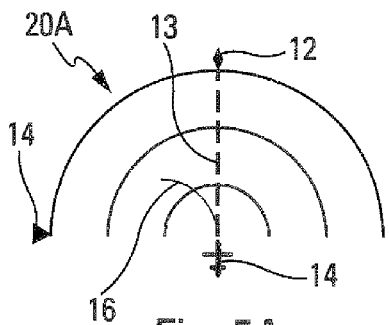
Figure 5B:
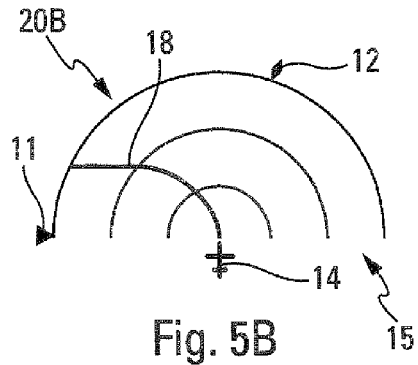

On the example of FIGS. 5A and 5B (illustrating a modification of the lateral directive on the flight control unit, accompanied with an increase of the directive of speed), without prediction of the trajectory, the representativity of the usual display 20A is limited by the fact that only the current speed is taken into account (the curvature radius remains constant). Thanks to the invention, the curvature radius of the trajectory increases at the same time as the speed of the aircraft, providing the pilot with a much better representation of the time and of the space required for performing the whole turn (FIG. 5B).

Figure 6A:
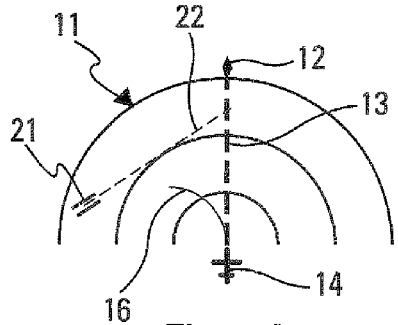
Figure 6B:
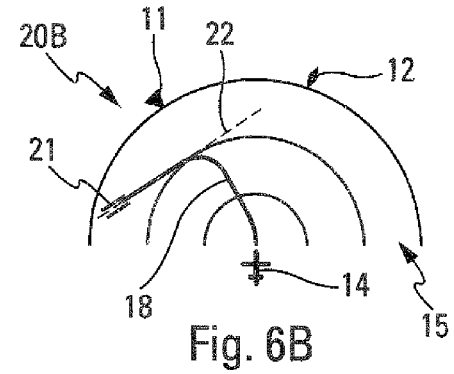

Additionally, it is known that a (guiding) mode of capture and follow up of an approach axis (for example a usual LOC mode) is geographically referenced, which does not involve any practical difficulty for displaying the predicted trajectory when the aircraft is located on the approach axis. On the other hand, the mode of capture and including the instant where the aircraft starts turning is not a simple data to be anticipated by crew. The prediction of the trajectory in the mode of capture of a runway axis allows the crew to anticipate the moment where the aircraft starts turning, as shown on FIG. 6B. FIGS. 6A and 6B display two symbols 21 and 22 respectively illustrating the position of the landing runway, on which landing will occur, and the axis of this runway being used as the approach axis.

Figure 7A:
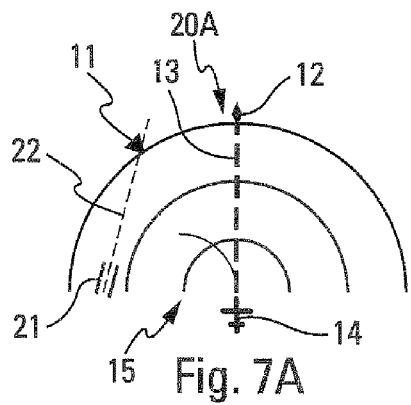
Figure 7B:
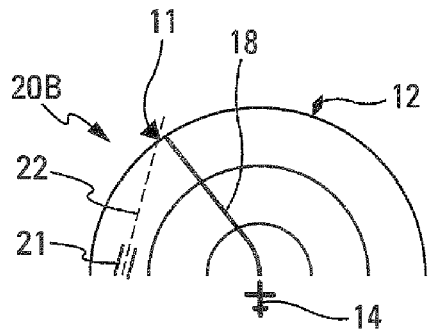
Figure 8A:
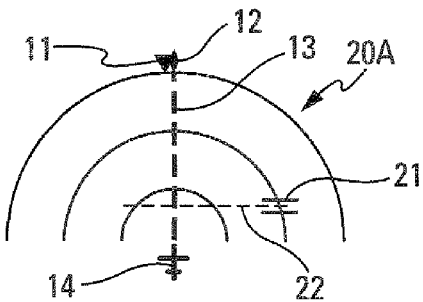
Figure 8B:
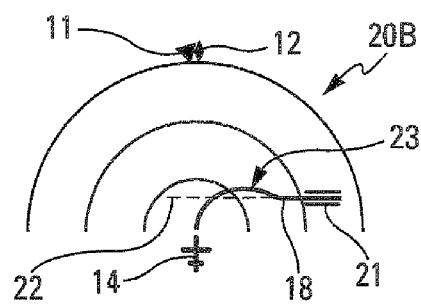

Moreover, some conditions of capture could be ignored by the crew, as they are rarely encountered in a current operation, for example the capture of the approach axis with an angle higher than 110°. An explicit display of the trajectory of capture advantageously allows the crew to know whether the capture will be able to be achieved. This is represented on the example of FIGS. 7A and 7B, illustrating, in the selected mode with the mode of approach being armed, a case of non capture of the axis 22 of the runway 21, resulting from an angle between the trajectory 18 and the runway axis 22 being higher than 110°.

This prediction of the trajectory of capture of the runway axis 22 also allows to make explicit the situations for which a later engagement request will lead the aircraft to overcome the runway axis 22. Such a late engagement request could, more specifically, be linked to a later authorization from the air control or to too high a speed. Thanks to the invention, and more precisely to the display 20B, the pilot has available information allowing him to take the right decisions (decreasing the speed or giving up the approach) in such a situation, as shown on the example of FIGS. 8A and 8B. Overcoming the axis 22 by the trajectory 18 is visible at the level of an area 23 on FIG. 88.

Figure 9A:
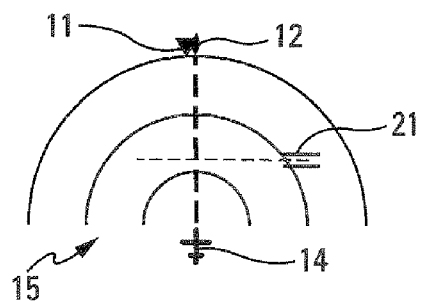
Figure 9B:
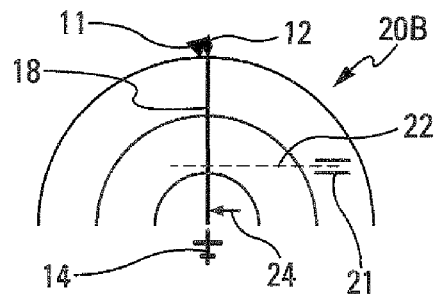

In addition, upon the capture and the follow up of an approach axis, if a mode of capture of the approach axis to be used for the capture is not armed yet:

the calculation device 5 determines the last point of the lateral trajectory where it is possible to arm this mode of capture so that the aircraft does not overcome the approach axis; and the displaying device 8 displays, on the display 20B of the viewing screen 10, at least one symbol 24, for example an arrow, illustrating this last point on the plot 18 (FIG. 9B).

With such an indication, the pilot can anticipate late requests from the air control and/or modify its speed directive so as to avoid overcoming.

Additionally, it is known that with the usual systems of automatic piloting, it is possible, in some cases, to preselect a directive. For example in a follow up mode of the flight plane of the NAV type, it is possible to display a heading value, before engaging the heading follow up mode. This preselected directive is only taken into account when the crew validates it. Also, in a particular alternative embodiment, shown as a broken line on FIG. 1, the device 1 further comprises an auxiliary calculation device 30 determining an auxiliary lateral trajectory that the aircraft will follow, according to a preselected guiding mode. To this end, they use the same method of calculation as for the lateral trajectory, applying it to the preselected directive. The auxiliary calculation device 30 receives to this end:

atmospheric data, via a link 31 being linked, preferably, to the set 2;

outlet information from the unit 3 relating to the pre-selection, via a link 32; and data (position, configuration, mode, flight parameters) of the aircraft, received from calculation device 5, via a link 33. The calculation device 5 determines this data for an origin point of the pre-selection (that is for the point of the current trajectory where the prediction of the preselection starts), such an origin point being received from the unit 3 via a link 34.

The displaying device 8 then presents on the display 20B of the viewing screen 10, in addition to the lateral trajectory (plot 18), also a plot 25 (received from the auxiliary calculation device 30 via a link 35) illustrating the auxiliary lateral trajectory.

Thus, the crew could visualize directly the trajectory linked to the pre-selection of a directive before validating it (usually). In this alternative embodiment, two lateral trajectories are therefore displayed to the crew:

the predicted trajectory 18 (thru the calculation means 5) with the currently selected directives; and the predicted trajectory 25 (thru the auxiliary calculation means 30) with the preselected directives.

Figure 10A:
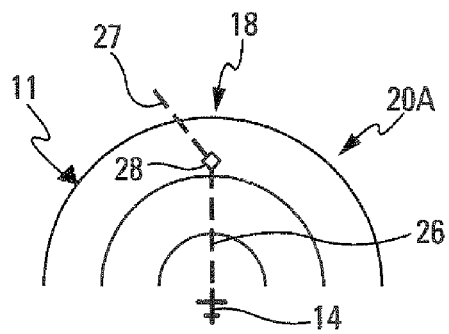
Figure 10B:
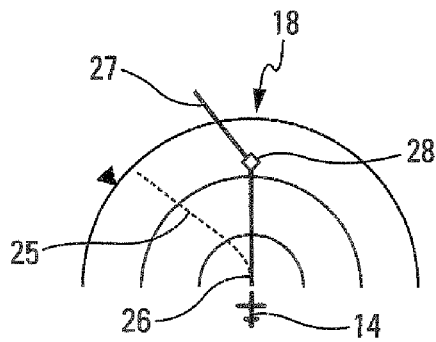

On the example of FIGS. 10A and 10B, the followed trajectory 18 corresponds to the flight plane and comprises for the represented part two successive straight line segments 26 and 27 joining in a track point 28.

Additionally, in a particular embodiment, the prediction of lateral trajectory in real time, implemented by the device 1, is coupled to a system (not shown) of detection of risks of collision of the aircraft with the ground, for detecting a risk of collision with the ground, ahead of the position of the aircraft along said lateral trajectory. In this case, the feeler (vertical profile defined as a function of the performances of the aircraft) usually used by this system, for detecting a future collision with the ground, is superimposed to the predicted trajectory (taking into account the error margins of positioning, of navigation, of guidance and of prediction of trajectory defining a corridor around the predicted lateral trajectory), rather than to the current position of the aircraft, allowing turns to be anticipated.

In this particular embodiment, the feeler taken into account by the detection system for risks of collision could allow, if appropriate, to validate any lateral trajectory predicted for lack of collision with the ground.

Thus, thanks to this particular embodiment:

collision alerts could be avoided, for example, when the aircraft starts to turn (nearly nil angle of roll) in the presence of a relief facing it; and conflicts with the ground could be detected earlier, for example in the case where the aircraft encounters some relief at the end of its turn.

Figure 2:
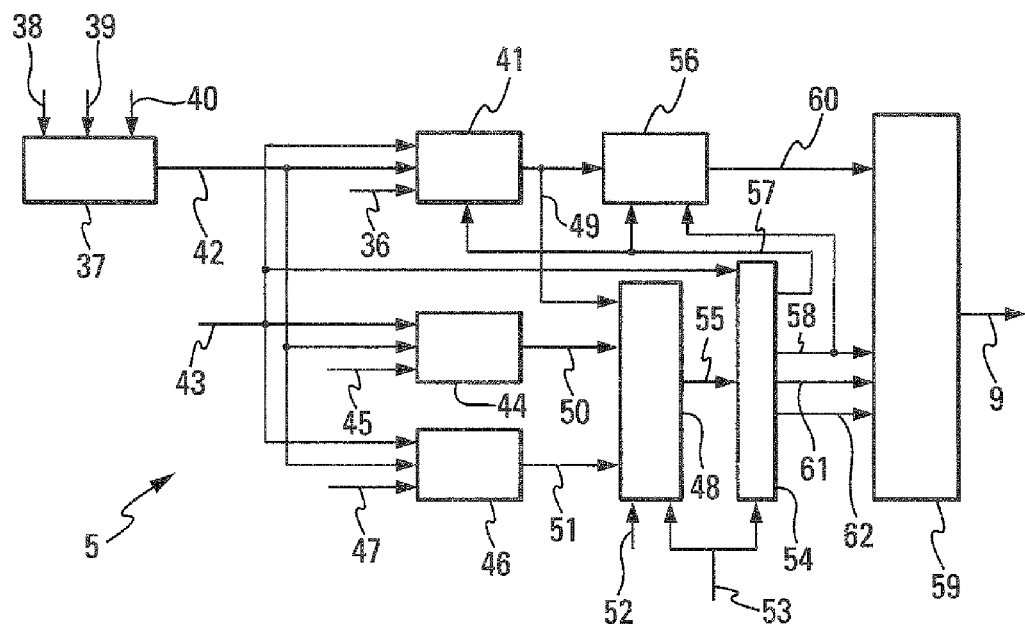
FIG. 2 is a block diagram of a calculation device for lateral trajectory, being part of a device according to the invention.

Additionally, in a preferred embodiment illustrated on FIG. 2, the calculation device 5 comprises the following device for determining the lateral trajectory:

an operational logics 37 for predicting the guiding mode, using information relative to the armed and engaged modes, received via a link 38, of the information from the unit 3, received via a link 39 (corresponding for example to the link 7), and of the position of the aircraft with respect to the selected runway axis, received via a link 40;

a lateral model 41 calculating the angle of roll of the aircraft, using the predicted mode received via a link 42 of the operational logics 37, of flight parameters (heading, track, corrected speed, actual speed, slope angle, etc.) received via a link 43, of a lateral target, received via a link 36, and of an actual speed of the TAS type being calculated and received via a link 57;

a speed model 44 calculating the acceleration of the aircraft, using the predicted mode received via a link 42, of the flight parameters received via the link 43, and of a target speed, received via a link 45;

a vertical model 46 calculating the slope angle of the aircraft, using the predicted mode received via the link 42, of the flight parameters received via the link 43, and of a lateral target, received via a link 47;

a model 48 of performances of the aircraft, calculating a couple of acceleration and of slope angle, using results received from the models 41, 44 and 46 via links 49, 50 and 51, of the configuration of the aircraft and of the point of flight received via a link 52, and of an indication relative to the wind, received via a link 53;

a processing device 54 being connected via a link 55 to the model 48 and determining the wind, as well as an actual speed, a ground speed and an altitude of the aircraft;

a model 56 of flight dynamics of the aircraft, calculating the heading of the aircraft, using the angle of roll received via the link 49 of the lateral model 41, as well as of the actual speed received via the link 57 and of the wind received via a link 58 from the processing device 54; and a calculation element 59 determining the lateral trajectory (as coordinates x and y in the horizontal plane), using the heading received from the model 56 via a link 60, as well as of the wind, of the ground speed and of the altitude received from the processing device 54 respectively via links 58, 61 and 62.

Additionally, according to a first alternative implementation, the determination of the lateral trajectory is based on a vector calculation. A full trajectory is calculated in a first step. The lateral, vertical and speed evolutions are predefined (as vectors) from prior data and the current state of parameters. If a change of mode is detected in a prediction field, the vertical and speed profile or the lateral profile or even both profiles are recalculated. Such a calculation is carried out as long as there are changes of mode in the remaining prediction field.

Moreover, according to a second alternative implementation, the determination of the lateral trajectory is based on a step by step calculation, using at any step the values of flight parameters of the previous step.

The determination according to the present invention of the lateral trajectory is therefore based on the knowledge and the modeling of the flight guiding laws of the aircraft in each one of its guiding modes, on the modeling of the dynamics setting of the aircraft in the atmosphere, as well as on the knowledge of the logics and the conditions of transition from a guiding mode to another.

What is claimed is:

1. A method for aiding flight management of an aircraft, the aircraft initially following an original flight plan and able to be guided according to one of a plurality of guiding modes, the method comprising the steps of:
   a) generating and collecting a set of information with a flight control unit, the set of information further comprising:
      current values of flight parameters of the aircraft;
      a guiding mode, the guiding mode chosen from a plurality of guiding modes; and
      at least one lateral directive to be followed by the aircraft, the lateral directive receivable by the flight control unit;
   b) determining an updated lateral trajectory to be followed by the aircraft, when the aircraft must deviate from the original flight plan, with a calculation device connected to the flight control unit, the calculation device using at least the set of information and at least one modeling of a guiding law corresponding to the chosen guiding mode; and
   c) displaying the updated lateral trajectory in real time on a viewing screen of a cockpit of the aircraft to illustrate how the aircraft will deviate from the original flight plan.

2. The method according to claim 1,
   wherein the set of information further comprises an indication relating to the wind, the indication relating to the wind being used for determining the updated lateral trajectory.

3. The method according to claim 1,
   wherein the set of information further comprises an indication relating to the speed of the aircraft, the indication relating to the speed of the aircraft being used for determining the updated lateral trajectory.

4. The method according to claim 1, further comprising:
   determining a directive of a heading and a current track of the aircraft wherein first and second symbols are displayed on the viewing screen, the first and second symbols illustrating the directive of heading and the current track of the aircraft, respectively.

5. The method according to claim 1, further comprising:
   upon receiving an approach axis displaying at least a third symbol on the viewing screen illustrating the approach axis.

6. The method according to claim 1, wherein:
   determining the updated lateral trajectory further comprises determining an auxiliary lateral trajectory to be followed by the aircraft according to one of the plurality of guiding modes; and
   the step of displaying further comprises displaying the auxiliary lateral trajectory on the viewing screen, in addition to the lateral trajectory.

7. The method according to claim 1, further comprising:
   using the updated lateral trajectory, detecting a risk of collision of the aircraft with a point on a ground surface, the point ahead of a position of the aircraft along the updated lateral trajectory.

8. The method according to claim 1, wherein:
   determining the updated lateral trajectory is based on a vector calculation.

9. The method according to claim 1, wherein:
   determining the updated lateral trajectory further comprises using the values of the flight parameters.

10. A device for aiding the flight management of an aircraft, the aircraft initially following an original flight plan and being able to be guided according to one of a plurality of different guiding modes, said device comprising:
    a set of sources of information able to generate current values of flight parameters of the aircraft;
    a flight control unit on which an operator can receive at least one lateral directive to be followed by the aircraft;
    a calculation device for determining an updated lateral trajectory to be followed by the aircraft when the aircraft must deviate from the original flight plan, said updated lateral trajectory being determined by at least one of the following:
       one set of information further comprising said current values of the flight parameters, a guiding mode, said guiding mode chosen from said plurality of guiding modes, and the at least one lateral directive received by said flight control unit; and
       at least one modeling of the guiding law corresponding to said chosen guiding mode; and
    a display device for presenting, in real time, said updated lateral trajectory on a viewing screen of a cockpit of the aircraft to illustrate how the aircraft will deviate from the original flight plan.

11. The device according to claim 10,
    wherein said calculation device further comprises a model of at least one of the following: lateral control, vertical control and speed control, wherein said vertical control and said speed control depend on said chosen guiding mode and a flight dynamics model.

12. The device according to claim 10, further comprising:
    an auxiliary calculation device for determining an auxiliary lateral trajectory-using at least one set of information, said set of information further comprising a guiding mode, wherein said auxiliary lateral trajectory is displayed on said viewing screen.

13. An aircraft, comprising a device for aiding the flight management of an aircraft, the aircraft initially following an original flight plan and being able to be guided according to one of a plurality of different guiding modes, said device comprising:
    a set of sources of information able to generate current values of flight parameters of the aircraft;

a flight control unit on which an operator can receive at least one lateral directive to be followed by the aircraft;

a calculation device for determining an updated lateral trajectory to be followed by the aircraft when the aircraft must deviate from the original flight plan, said updated lateral trajectory being determined by at least one of the following:

one set of information further comprising said current values of the flight parameters, a guiding mode, said guiding mode chosen from said plurality of guiding modes, and the at least one lateral directive received by said flight control unit; and at least one modeling of the guiding law corresponding to said chosen guiding mode; and a display device for presenting, in real time, said updated lateral trajectory on a viewing screen of a cockpit of the aircraft to illustrate how the aircraft will deviate from the original flight plan.

\* \* \* \* \*